United States Patent [19]

Woods et al.

[11] Patent Number: 5,524,211
[45] Date of Patent: Jun. 4, 1996

[54] SYSTEM FOR EMPLOYING SELECT, PAUSE, AND IDENTIFICATION REGISTERS TO CONTROL COMMUNICATION AMONG PLURAL PROCESSORS

[75] Inventors: Greg Woods, San Jose; Carol Bassett; Robert Campbell, both of Cupertino, all of Calif.

[73] Assignee: Hewlett Packard Company, Palo Alto, Calif.

[21] Appl. No.: 37,483

[22] Filed: Mar. 25, 1993

Related U.S. Application Data

[63] Continuation of Ser. No. 654,681, Feb. 13, 1991, abandoned.

[51] Int. Cl.$^6$ ............................ G06F 13/00; G06F 15/16
[52] U.S. Cl. ..................... 395/200.1; 395/287; 395/310; 364/DIG. 1; 364/280; 364/230; 364/238.7; 364/244.5
[58] Field of Search ................. 340/825.07, 825.08, 340/825.52; 370/77, 85.8, 95.1–.3; 395/200, 275, 325, 400, 725, 800

[56] References Cited

U.S. PATENT DOCUMENTS

| | | | |
|---|---|---|---|
| 3,742,148 | 6/1973 | Ledeen et al. | 179/15 BA |
| 4,368,514 | 1/1983 | Persaud et al. | 395/200 |
| 4,583,182 | 4/1986 | Breddan | 364/492 |
| 4,590,468 | 5/1986 | Stieglitz | 340/825.5 |
| 4,667,193 | 5/1987 | Cotie et al. | 340/825.08 |
| 4,677,615 | 6/1987 | Orimo et al. | 370/89 |
| 4,729,095 | 3/1988 | Colley et al. | 395/375 |
| 4,751,630 | 6/1988 | Kelley, Jr. et al. | 395/200 |
| 4,760,572 | 7/1988 | Tomikawa | 370/94 |
| 4,768,145 | 8/1988 | Wheelwright et al. | 395/325 |
| 4,779,195 | 10/1988 | James | 395/725 |
| 4,794,649 | 12/1988 | Fujiwara | 455/9 |
| 4,829,516 | 5/1989 | Orimo et al. | 370/88 |
| 4,888,684 | 12/1989 | Lilja et al. | 395/325 |
| 4,930,070 | 5/1990 | Yonekura | 395/725 |
| 5,045,995 | 9/1991 | Levinthal et al. | 395/375 |
| 5,045,996 | 9/1991 | Barth et al. | 395/425 |

*Primary Examiner*—Thomas C. Lee
*Assistant Examiner*—Lance L. Barry

[57] ABSTRACT

A control unit is assigned to each microprocessor of a multiprocessor (MP) system. Each control unit is in communication with its associated microprocessor and the system bus. Each control unit comprises a register set having bit registers and word registers. Messages can be sent to one or more of the microprocessors concurrently via a select function. Specifically, a data byte is bit sliced or bit masked so that the select register associated with one or more processors is activated. The bit registers which are activated, enable associated word registers for subsequent accesses. Consequently, one or more processors may be accessed concurrently. Moreover, bit pause registers are utilized so as to simultaneously pause one or more processors. Finally, bit identification registers may be read by any processor to determine the location of the processor.

8 Claims, 4 Drawing Sheets

SYSTEM FOR EMPLOYING SELECT, PAUSE, AND IDENTIFICATION REGISTERS TO CONTROL COMMUNICATION AMONG PLURAL PROCESSORS

CROSS REFERENCE TO RELATED APPLICATION

This application is a continuation of application Ser. No. 07/654,681, filed Feb. 13, 1991, now abandoned.

BACKGROUND OF THE INVENTION

I. Field of the Invention

The present invention relates to computer systems, and more particularly, to a computer architecture for providing high performance addressing of and data transfers to processors in a multiprocessor (MP) system.

II. Related Art

As a consequence of the rapidly evolving personal computer (PC) industry, high end PCs have migrated into high performance applications which were traditionally handled by minicomputers or mainframe computers. These high performance applications require interaction with many peripherals at high speeds as well as manipulation of enormous amounts of data to provide real time operation as perceived by the PC user.

As a result, multiple processors have been implemented in PC architectures to maximize speed by allocation of tasks and responsibilities which can be performed in parallel. By design, the independent processors of a multiprocessor (MP) system usually execute instructions simultaneously via a multithread instruction set to concurrently process transactions.

As more and more processors are added to an MP system, the communication and control of processors becomes more complex. Generally, the processors must communicate via a bus network comprised of several buses. Moreover, the addressing of processors and the transmission of data to processors via the bus network pose an extreme burden on an MP system as more processors are added. One reason is that an increase in traffic on the bus network occurs with an increase in the number of processors because more processors fight for control of the buses in order to perform addressing and data transfer functions. Thus, the MP system becomes slower and the total number of processors which may be implemented is limited.

Furthermore, as more processors are added to the MP system, processor time delays increase while processors fight for control of the buses and must wait until receiving control. Consequently, the purpose of adding processors to increase speed by concurrent processing of data is defeated because of the increase in processor delays, which equates to wasted processor time.

Finally, because many different types of buses and processors for PC architectures exist in the industry, any solution to the foregoing problems should be flexible in implementation. A solution should accommodate the protocols and compatibility models of the various types of commercially available buses and processors which may be incorporated into the MP system to be cost justified.

SUMMARY OF THE INVENTION

The present invention is an apparatus, system, and method for providing high performance addressing of and data transfers to processors in a multiprocessor (MP) system, while allowing for a flexible and cost justified implementation.

An apparatus is assigned to each processor of the MP system. The apparatus has at least one bit register adapted to recognize an exclusive data bit on a system bus. The apparatus further comprises at least one word register having access to data bytes on the system bus. Decode logic in the apparatus communicates with the system bus and controls the bit register(s) and the word register(s).

In an embodiment of the present invention, a "select" function is envisioned. The decode logic either enables or disables the word register(s) in accordance with the state of a bit register, called a select register.

In operation, the select registers of the MP system are utilized as follows. First, a data byte intended to selectively activate one or more processors is generated on the system bus. Second, at each select register, an exclusive data bit from the data byte is recognized. Third, the word register(s) in each apparatus which recognizes the exclusive data bit in an active state are enabled. Finally, the word register(s) in the each apparatus which received the exclusive data bit in an active state in the previous step are written to concurrently. Thus, the select registers associated with each processor of the MP system can permit selective and concurrent control of processors.

In another embodiment of the present invention, the apparatus assigned to each processor of the MP system implements a "pause" function. The apparatus of the MP system comprises a pause register adapted to recognize a data bit from a data byte on a system bus, similar to the select register. However, the pause register either enables or disables the associated, local processor.

In operation, the pause function is implemented as follows. First, a data byte intended to selectively pause one or more processors is generated on the system bus. Second, at each pause register, an exclusive data bit from the data byte is recognized. Finally, each of the one or more processors having a corresponding exclusive data bit in an active state is paused. Hence, the pause registers of the MP system can permit selective pausing of one or more processors simultaneously.

In still another embodiment of the present invention, the implementation of an "identification" function in the apparatus is envisioned. In order to implement the identification function, bit identification registers are associated with each processor. The identification registers are adapted to access an exclusive data bit on a system bus, similar to the select and pause registers.

However, each identification register is in an active state when the corresponding local processor is accessing the system bus for a data byte comprising each exclusive data bit from all of the identification registers. Accordingly, the identification registers collectively provide a data byte on the system bus for indicating the position of a processor which requested the data byte.

In operation, the identification function is effectuated as follows. First, the identification register associated with a local processor is caused to be in an active state when the local processor accesses the system bus for a data byte comprising each exclusive data bit from all of the identification registers. Second, the data byte is read from the system bus at the local processor. Finally, the location of the local processor is determined at the local processor based upon the data byte. Consequently, the identification registers of the MP system permit a program in any processor to easily discern the processor's address or location in the MP system.

FEATURES AND ADVANTAGES OF THE INVENTION

The present invention overcomes the deficiencies of the prior art, as noted above, and further provides for the following additional features and advantages.

First, the present invention permits selective and concurrent control of processors in an MP system to thereby enhance the performance of the MP system.

Second, the present invention reduces the amount of traffic, including addressing and data transmissions, on the buses of the MP system. As a result, the response and speed of the MP system as a whole is enhanced, and the number of processors that may be interfaced to the MP system is thereby increased.

Third, the present invention may be practiced without redefining the protocols and/or the compatibility models of the various conventional buses which may be incorporated into the MP system.

Fourth, the present invention allows for a versatile processor configuration. In other words, the present invention can be implemented with homogeneous or nonhomogeneous MPUs. For example, MPUs from the "INTEL" family of MPUs (manufactured by the Intel Corporation, U.S.A.) may be mixed with the "MOTOROLA" family of MPUs (manufactured by Motorola, Inc., U.S.A.).

Fifth, the present invention permits the implementation of a pause function in an MP system. When debugging the MP system, any processor or any subset of all of the processors can be easily forced to temporarily cease operation, while other processors are analyzed.

Sixth, the present invention permits the implementation of an identification function in the MP system. During operation in a specific MPU, the program code can read a register within the register set of the associated control unit to thereby easily and quickly determine its own identity.

Further features and advantages of the present invention will become apparent to one skilled in the art upon examination of the following drawings and detailed description. It is intended that any additional features and advantages be incorporated herein.

BRIEF DESCRIPTION OF THE DRAWINGS

The present invention as defined in the claims can be better understood with reference to the text and to the following drawings:

DETAILED DESCRIPTION OF THE PREFERRED EMBODIMENT

I. Global Architecture of the Present Invention

Figure 1:
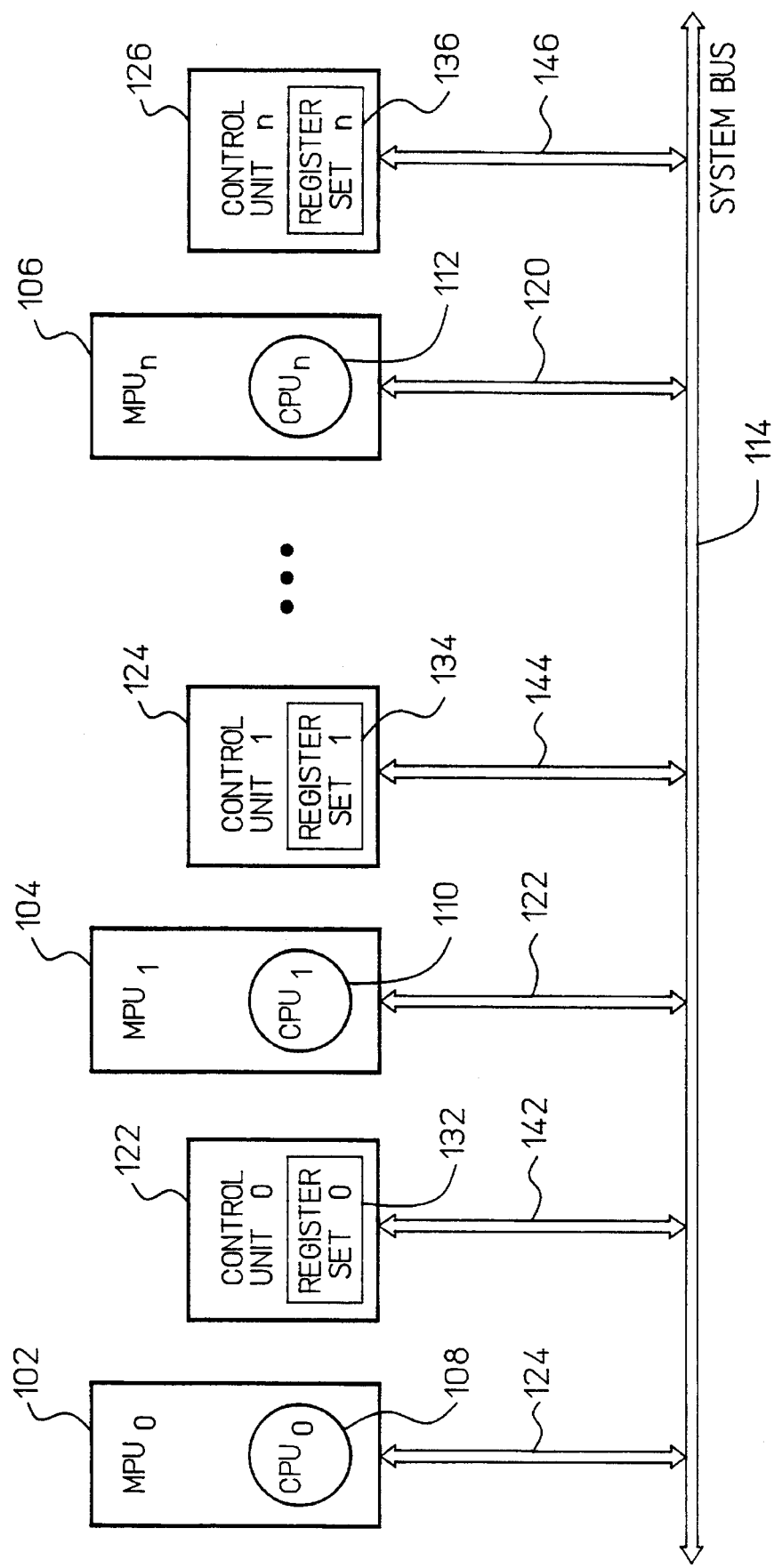
FIG. 1 illustrates the architecture of the present invention wherein a multiprocessing (MP) system has n microprocessing units (MPU) with respective n central processing units (CPU) and with respective n control units for managing communication and control of the MP system.

FIG. 1 illustrates the architecture of the present invention. A multiprocessing (MP) system has n microprocessing units (MPU) 102–106 with respective n central processing units (CPU) 108–112. The multiprocessing (MP) system of FIG. 1 may be implemented in a personal computer (PC).

As shown in FIG. 1, the n MPUs 102–106 communicate via a system bus 114 for purposes of discussion. The MPUs 102–106 can reside on several architecturally isolated buses. In other words, the system bus 114 could be a combination of homogeneous or nonhomogeneous buses interconnected with appropriate interfaces and buffering devices. Moreover, any of the n MPUs 102–106 could reside on conventional input/output (I/O) cards (not shown) which are connected to the system bus 114 via I/O slots (not shown).

Further, n control units 122–126 are implemented to manage communication and control of the respective n MPUs 102–106. Each of the n MPUs 102–106 is assigned an exclusive, external control unit. Moreover, each of the n control units 122–126 serves to manage communication and control of its respective MPU in the MP system.

Figure 2:
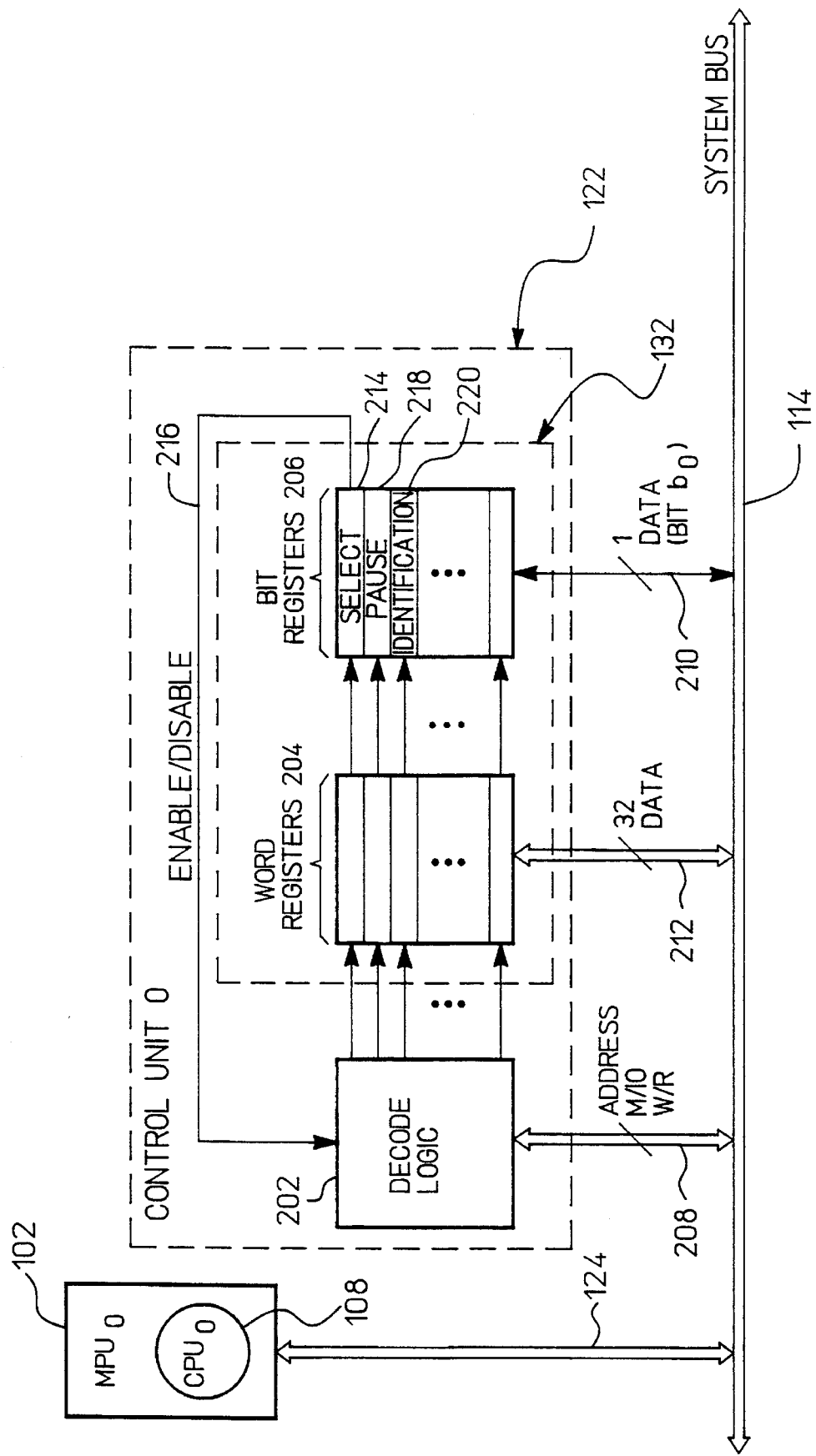
FIG. 2 shows the architecture of the preferred embodiment of the present invention which is to be implemented in the MP system of FIG. 1.

Each of the n control units 122–126 comprises a corresponding register set, or "stack" of registers. As shown in FIG. 2, the n control units 122–126 comprise respective n register sets 132–136. Each of the n register sets 132–136 is continuously monitored by its corresponding one of n CPUs 108–112.

II. Architecture of Control Units

FIG. 2 shows a detailed block diagram of an individual control unit in the preferred embodiment of the present invention. For purposes of simplicity in the discussion, only the control unit 122 with its associated MPU 102 are shown. However, the architecture shown in FIG. 2 as well as the following discussion are intended to be applied to all of the control units 122–126.

As shown in FIG. 2, the control unit 122 includes the register set 132 and decode logic 202. In accord with the present invention, some of the registers within the register set 132 are bit registers 204 and others are word registers 206.

A. Bit Registers

In operation, the decode logic 202 reads an address from the system bus 114 through a control bus 208. The address could correspond to a data read or a data write. Accordingly, a specific bit register (row) within the set of bit registers 206 is selected, or enabled, by the decode logic 202.

Moreover, all of the bit registers 204 read from and write to a specific data bit on the system bus 114 via a data line 210. In other words, 32-bit data bytes transmitted onto the system bus 114 are "bit sliced," as will be discussed below with reference to a specific example in FIG. 3.

It is also envisioned that the bit registers could be larger registers which are "bit masked," thereby serving the same function. Accordingly, the discussion that follows is also applicable to the latter implementation as well.

Figure 3:
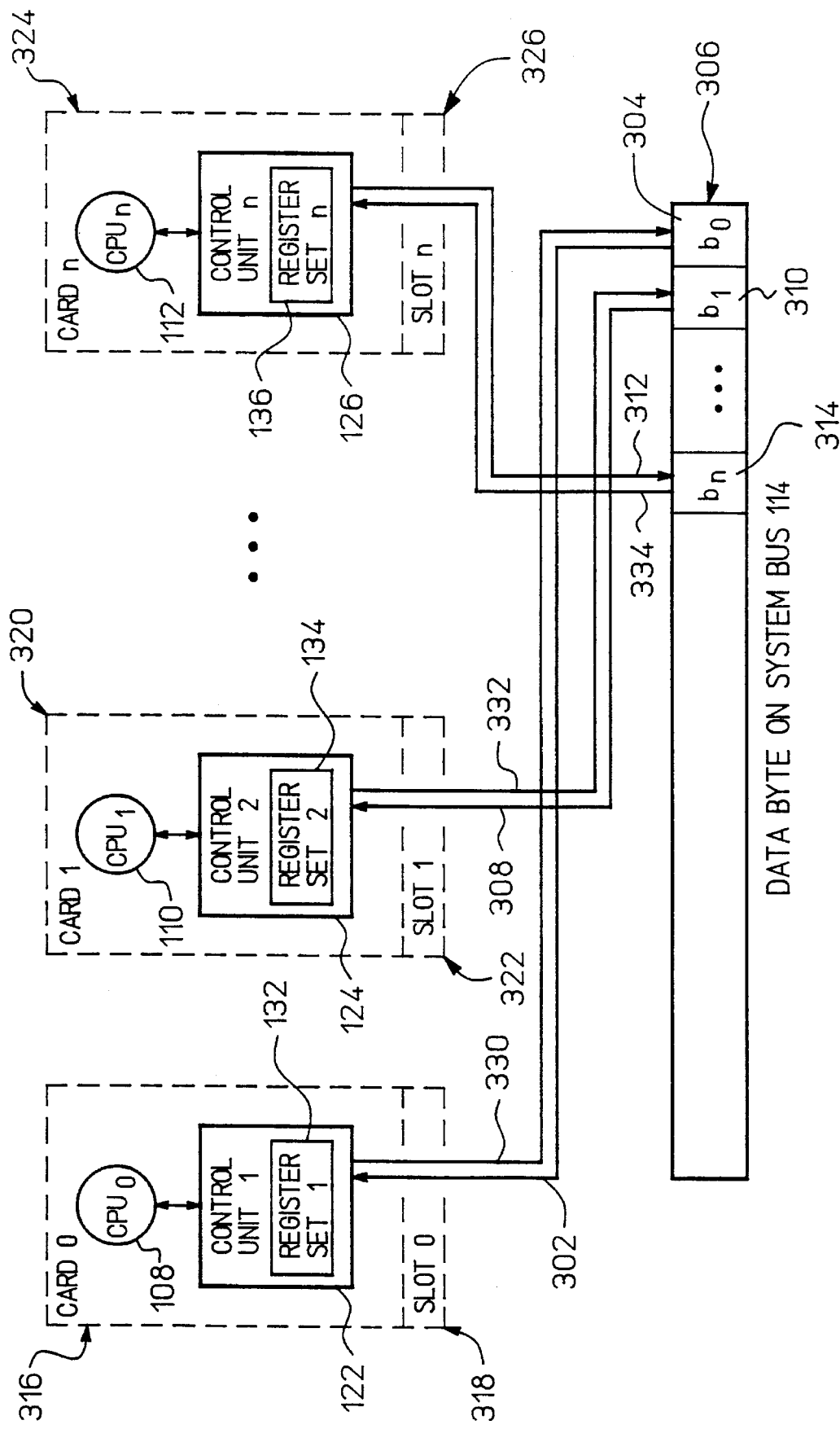
FIG. 3 illustrates the concept of bit slicing or bit masking in accordance with the preferred embodiment.

As indicated in FIG. 3, each of the n control units 122–126 can report or listen to one or more different bits in each data byte on the system bus 114. Accordingly, as shown by an arrow 302, the control unit 122 is allocated a bit 304 of a data byte 306 on the system bus 114. As shown by an arrow 308, the control unit 124 is allocated a bit 310. Finally, as shown by an arrow 312, the nth control unit 126 is allocated a bit 314.

Further, for simplicity in implementations where one or more of the n CPUs 108–112 resides on an I/O card and where only one data bit is allocated to each of the n control devices 122–126 (more than one data bit could be bit sliced to each), the allocated bit can be the same as the I/O slot number of the I/O card comprising the associated CPU. For example, as shown in FIG. 3, the CPU 108 on an I/O card 316 residing in slot "0", as denoted by reference numeral 318, would be allocated data bit "0", or bit $b_0$. Moreover, the CPU 110 on an I/O card 320 residing in slot "1", as denoted by reference numeral 322, would be allocated bit "1", or bit $b_1$, and so on.

B. Word Registers

Referring back to FIG. 2, the word registers 204 read from and write to 32 data bits on the system bus 114 via a data bus 212. A specific register (row) within the set of word registers 204 is selected and enabled by the decode logic 202, similar to operation in regard to the bit registers 206.

III. Methodology of the Present Invention

As a result of bit registers and bit slicing (or masking) as well as full size word registers, the present invention can provide for simultaneous, independent control of each of the n MPUs 102–106, or a subset thereof, in several different respects. The present invention envisions implementing (1) a SELECT function, (2) a PAUSE function, and (3) an IDENTIFICATION function, as described in further detail below.

A. SELECT Function

FIG. 2 shows a SELECT register 214, which is a bit register within the set of bit registers 206. It is envisioned that the SELECT register 214 can be utilized as sort of a switch to enable and disable the local word registers 204, or a subset thereof. As shown, an enable/disable line 216 is situated so as to inform the decode logic 202 whether or not to activate the word registers 204.

As a result of the SELECT register 214, a data byte, which is ultimately bit sliced, can be written on the system bus 114 to turn on, or enable, one or more word registers of the n register sets 132–136 corresponding to the n CPUs 108–112 of the MP system. Subsequently, a data word or series of successive data words can be broadcast simultaneously in parallel to any of the enabled word registers of the n register sets 132–136. Finally, via an interrupt, messages transferred to enabled word registers can be loaded to the local CPUs from the involved control units. Hence, by the present invention, messages are selectively broadcast to a select set of n CPUs 108–112.

Figure 4:
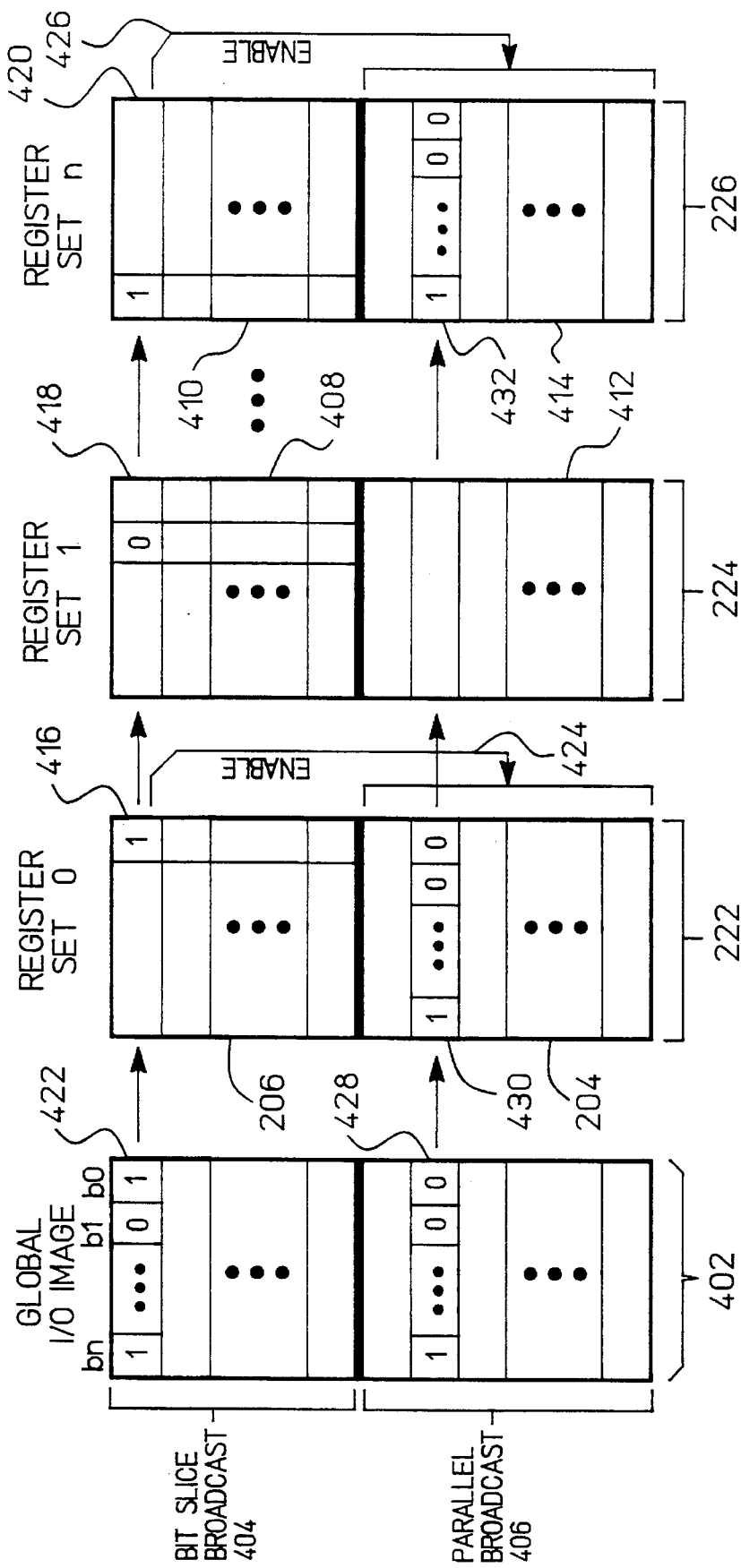
FIG. 4 shows the structure of n register sets within the n control units of the preferred embodiment.

To understand the concept of the SELECT function more clearly, FIG. 4 illustrates the relationship of a global I/O image 402, which is the global view (sequence) of the address space of the MP system from a software perspective, to the n register sets 132–136, within the n control units 122–126.

The global I/O image 402 shows that some data bytes (top) are broadcast in a bit slice fashion and other data bytes (bottom) are broadcast in the conventional parallel fashion, as indicated by reference numerals 404 and 406, respectively. Accordingly, as shown, each of the n register sets 222–226 comprises a set of bit registers (or full size, bit masked registers) and a set of word registers.

Moreover, each of the register sets has a SELECT register, as denoted by reference numerals 416–420.

As an example, it is assumed that a bit-sliced data byte 422 having the binary configuration "1 ... 01" ($b_n ... b_1 b_0$) is transmitted onto the system bus 114 by a CPU, bus master, I/O device, or the like. Along with the data byte 422, the following signals are sent on the system bus 114: (1) an appropriate 32-bit address directed to the SELECT registers 416–420 in each register set, (2) an I/O control signal on an memory/input-output (M/IO) control line, and (3) a write signal on a write/read (W/R).

Recognizing that an I/O write is taking place, the decode logics of each of the register sets 222–226 read the 32-bit address and, consequently, read the data bit corresponding to the particular SELECT register, from the data byte 422. In the preferred embodiment, the bit $b_0$ of the data byte 422 is directed to the SELECT register 416 of register set 222. The bit $b_1$ is directed to the SELECT register 418 of the register set 224, and so on. Finally, the bit $b_n$ is directed to the SELECT register 420 of the register set 226.

Being that the SELECT register in the register sets 416 and 420 read a high logical level signal ("1"), indicating active in the preferred embodiment, the word registers 204 and 414 in the register sets 416 and 420 are enabled for a subsequent read or reads, as indicated by respective arrows 424 and 426.

Next, a data byte 428 having the binary configuration "1 ... 00", for example, is broadcast on the system bus 114, pursuant to an appropriate address. The data byte 428 is then concurrently read in parallel by the word registers 430 and 432 of respective register sets 222 and 226. The word registers 430 and 432 exist at the same address location.

Hence, the SELECT registers in accordance with the present invention function as sort of a global mask. Furthermore, the implementation of a SELECT function in the MP system of FIG. 1 allows for concurrent broadcasting of messages to one or more of the MPUs 102–106. Concurrent broadcasting is particularly advantageous.

Using the SELECT function results in faster data broadcasts. For example, a translation lookaside buffer (TLB), which is a special internal buffer of an MPU, may need to be updated and maintained coherent in all of the n MPUs 102–106 depending upon the design of the MP system. Being able to concurrently write to each TLB of each MPU increases performance by eliminating the need to write to each MPU individually, as is the case in the conventional art.

Moreover, a data word can be sent to one, two, or more of the n MPUs 102–106 of the MP system in only two write cycles. In the conventional art, where one data word needs to be written to two MPUs, four bus cycles would be required. Each MPU would need to be specifically addressed (2 bus cycles) and then the data word would need to be written to each (2 bus cycles). Consequently, the present invention reduces the number of expended bus cycles and traffic on the system bus 114.

In addition, each of the MPUs 102–106 individually can still be sent a message, such as an interrupt, thereby resulting in flexible functionality of the present invention.

The SELECT function is also advantageous where it is desirable to initiate program functions simultaneously in separate MPUs of the n MPUs 102–106. Programs in separate MPUs may be commanded to commence at exactly the same instance. The ability to initiate program functions simultaneously allows for more flexibility and simplicity with respect to program design and the interrelation of hardware and software.

B. PAUSE Function

Another advantage of the present invention is that it permits the implementation of a PAUSE function. Because of the PAUSE register 218, shown in FIG. 2, any of the n MPUs 102–106 or a subset of all of the n MPUs 102–106 may be concurrently paused, or put on hold, for any amount of time during operation of the MP system.

To "pause" an MPU in this context means to cause the MPU to temporarily cease its I/O operations and go idle. Moreover, after an MPU is no longer commanded to pause, the MPU will proceed with its program execution from the program point where it was paused. In other words, the PAUSE function does not reset MPUs.

In order to pause one or more of the n MPUs 102–106, a data byte is broadcast on the system bus 114. The data byte is bit spliced (or bit masked), as discussed previously with respect to the SELECT function, so that each of the PAUSE registers of the n MPUs receives an exclusive data bit. Each of the n MPUs 102–106 which are desired to be paused, are sent a data bit at a low logical level ("0") in the preferred embodiment. When the n MPUs 102–106 read their local PAUSE registers, those which read a data bit at a low logical level ("0") are paused. Any paused MPUs temporarily cease I/O functions and go idle.

To release the pause status and reactivate the paused MPUs, another data byte is broadcast on the system bus 114 to the various PAUSE registers. The data byte would comprise data bits at a high logical level ("1") in those bit positions corresponding to the MPUs to be activated. Upon activation of the paused MPUs, the MPUs proceed with execution of their respective programs at the point at which they were paused.

The ability to implement the foregoing PAUSE function is extremely advantageous when debugging the MP system. One reason is that conventionally it is difficult to debug the MP system when more than one of the n MPUs 102–106 is operating simultaneously. Consequently, when debugging, the present invention envisions pausing one or more of the n MPUs 102–106, while analyzing the response of one or more other MPUs of the set.

C. IDENTIFICATION Function

Another advantage of the present invention is that it permits the implementation of an IDENTIFICATION function via the IDENTIFICATION register 220, as shown in FIG. 2.

Oftentimes, it is desirable to have all of the n CPUs 108–112 executing the same program code on the same memory space, so as to minimize complexity and program code overhead. However, in such implementations, it becomes necessary occasionally for the program code operating in a certain CPU to know the certain CPU's identity, or address location, as distinguished from the other n-1 CPUs of the MP system. The present invention allows the program code of an initiating CPU to easily discern the CPU's identity.

With reference to FIG. 3, the IDENTIFICATION function would proceed as follows. Instead of data bits being bit sliced from the data byte 306 on the system bus 114 and transmitted individually to the various n CPUs 108–112, as with the SELECT and PAUSE functions, data bits from the IDENTIFICATION registers of the corresponding n CPUs 108–112 are transmitted to the system bus 114 to thereby form the data byte 306. The formation of the data byte 306 by the IDENTIFICATION bit registers is indicated by arrows 330–334.

Further, the formation of data byte 306 occurs when the decode logics of the various n control units 122–126 detect an I/O read from their corresponding identification registers via the M/IO and W/R control lines on the system bus 114. The I/O read is initiated by the program code of the CPU desiring to know its location in the MP system.

Moreover, the program code of the initiating CPU can easily and efficiently determine its slot or card number by reading the resultant data byte 306 formed on the system bus 114. For example, if the data byte 306 had a binary configuration "0 . . . 0100", then the certain CPU initiating the identification function would be that CPU which was loaded into I/O slot 2, because the "1" is situated at bit $b_2$. Similarly, if the "1" had been positioned at bit $b_1$, then the initiating and identified CPU would have been that which was loaded in slot 1, and so on.

Each of the n control units 122–126 detects whether its associated CPU generated the I/O read of the n identification registers and accordingly inserts a high logical level ("1") in its corresponding identification register. Each of the n control units 122–126 knows when its associated CPU has initiated the I/O read by listening to bus control signals which are generated by its associated CPU. These bus control signals could include, for example, bus request or grant signals.

Specifically, in order for a CPU to read a data byte from the system bus 114, the CPU must generate a bus request signal on the system bus 114. A bus arbitration unit (not shown), which continuously dictates what is to take control of the system bus 114, reads the bus request signal and eventually will generate a bus semaphore to permit the CPU to take control of the system bus 114. After the CPU receives the semaphore from the bus arbitration unit to access the system bus 114, the CPU generates another signal known as an acknowledge signal on the system bus 114.

Moreover, the CPU could then transmit, perhaps, an address output enable or some other command on the system bus 114. Thus, various signals being transmitted onto the system bus 114 from the initiating CPU may be utilized by the associated control unit to determine that its corresponding CPU initiated the I/O read (or IDENTIFICATION function).

When the initiating CPU reads the data byte 306 from the system bus 114 which comprises all the data bits from all the IDENTIFICATION registers, the initiating CPU will assume that the "1" in the data byte originated from itself and will attribute the bit position of the "1" to the slot position of the CPU.

If desired, the I/O slot or I/O card numbers can easily be converted to addresses via a lookup table or some other conventional means.

Hence, the present invention allows the program code of any of the n CPUs 108–112 of the MP system to easily discern its identity as distinguished from the others.

It should be understood that present invention is not limited to its preferred embodiment, and that the specific examples presented above are merely for the purpose of illustration. The scope of the present invention should therefore be interpreted by the following claims as defined by the foregoing figures and text.

We claim the following:

1. A multiprocessing computer which includes a plurality of processing entities connected together by a system bus, the processing entities utilizing the system bus to transfer data, each processing entity comprising:

(a) a processor;

(b) a select register coupled to the system bus, the select register storing a first data bit pertaining exclusively to the processor, the select register receiving the first data bit from a first bit position of a first data transfer unit sent on the system bus, the first bit position being unique to the processing entity;

(c) a word register connected to the system bus and the processor, the word register storing transferred data directed to the processor, the word register receiving the transferred data from the system bus and the transferred data being available to the processor after being received by the word register; and, (d) decode logic means, coupled to the system bus, the select register and the word register, for controlling the word register, the decode logic means accessing the first data bit within the select register and enabling and disabling the word register in accordance with the first data bit, thereby permitting selective control of communication to the processor via the system bus.

2. A multiprocessing computer as in claim 1 wherein each processing entity additionally comprises:

a pause register, coupled to the system bus and the decode logic means, the pause register receiving a second data bit pertaining exclusively to the processor, the pause register receiving the second data bit from the first bit position of a second data transfer unit sent on the system bus, wherein the decode logic means accesses the second data bit within the pause register and enables and disables the processor based upon the second data bit accessed from the pause register, thereby permitting selective disabling of the processor via the system bus.

3. A multiprocessing computer as in claim 1 wherein each processing entity generates and sends network messages and each processing entity additionally comprises:

an identification register, coupled to the system bus and the decode logic means, the identification register containing a second data bit pertaining exclusively to the processor, wherein when the processing entity generates a first network message, the decode logic means sets the second data bit to a first logic value and when the processing entity sends the first network message, the decode logic means places contents of the identification register in a second data transfer unit of the first network message at the first bit position.

4. A multiprocessing computer which includes a plurality of processing entities connected together by a system bus, the processing entities utilizing the system bus to transfer data, each processing entity comprising:

(a) a processor;

(b) a pause register coupled to the system bus, the pause register storing a first data bit pertaining exclusively to the processor, the pause register receiving the first data bit from a first bit position of a first data transfer unit sent on the system bus, the first bit position being unique to the processing entity; and (c) decode logic means, coupled to the system bus and the pause register, for accessing the first data bit within the pause register and enabling and disabling the processor based upon the first data bit accessed from the pause register, thereby permitting selective disabling of the processor via the system bus.

5. A system in each processing entity of a multiprocessing computer for permitting a process within the processing entity to discover an address of the processing entity within the multiprocessing computer, the multiprocessing computer including a system bus connected to each processing entity, each processing entity generating and sending network messages over the system bus, the system comprising:

(a) a processor;

(b) an identification register coupled to the system bus, the identification register storing a first data bit pertaining exclusively to the processor; and, (c) decode logic means, coupled to the system bus and the identification register, for setting the first data bit to a first logic value when the processing entity generates a first network message, and for placing contents of the identification register in a data transfer unit of the first network message when the processing entity sends the first network message, the first bit position being unique to the processing entity.

6. The system of claim 5, wherein the processor generates bus request signals to be sent over the system bus and wherein the decode logic means monitors the bus request signals from the processor to determine when to set the first data bit to the first logic value.

7. The system of claim 5, wherein the processor generates bus acknowledge signals to be sent over the system bus and wherein the decode logic monitors the bus acknowledge signals from the processor to determine when to set the first data bit to the first logic value.

8. The system of claim 5, wherein the processor generates output enable signals to be sent over the system bus and wherein the decode logic monitors address output enable signals from the processor to determine when to set the first data bit to the first logic value.

* * * * *